United States Patent [19]
Lindemann et al.

[11] 3,976,364
[45] Aug. 24, 1976

[54] OPTICAL AIR LENS SYSTEM

[76] Inventors: Harley Burke Lindemann, 1533 Park Grove Road, Baltimore, Md. 21228; John Boyden Goodell, 1201 Southview Road, Baltimore, Md. 21218

[22] Filed: Mar. 17, 1975

[21] Appl. No.: 559,011

Related U.S. Application Data

[63] Continuation-in-part of Ser. No. 427,257, Dec. 21, 1973, abandoned.

[52] U.S. Cl. .................................. 350/179; 351/43; 350/175 E
[51] Int. Cl.² ........................ G02B 1/06; G02C 1/00
[58] Field of Search ........ 350/179, 175 E, 175 ML, 350/212; 351/43

[56] References Cited
UNITED STATES PATENTS

| | | | |
|---|---|---|---|
| 2,080,120 | 5/1971 | Everett | 350/179 |
| 3,297,393 | 1/1967 | Ziegler | 350/179 |
| 3,383,622 | 5/1968 | Dixon et al. | 350/179 X |
| 3,405,992 | 10/1968 | Hutson et al. | 350/193 X |
| 3,506,332 | 4/1970 | Dewey, Jr. et al. | 350/179 X |
| 3,514,188 | 5/1970 | Blosse et al. | 350/212 |
| 3,586,419 | 6/1971 | Wakimoto et al. | 350/179 |

FOREIGN PATENTS OR APPLICATIONS

| | | | |
|---|---|---|---|
| 1,112,278 | 11/1955 | France | 351/43 |
| 3,164 | 1912 | United Kingdom | 350/179 |

*Primary Examiner*—John K. Corbin
*Assistant Examiner*—Conrad Clark
*Attorney, Agent, or Firm*—Finnegan, Henderson, Farabow & Garrett

[57] ABSTRACT

In an optical system the use of a plurality of air lenses set in an optical medium of higher refractive index than air at a predetermined distance from an object such that various optical aberrations are minimized or eliminated by using aplanatic optical surfaces. Refraction occurs only for a ray going from the higher to the lower refractive index medium. Rays entering the higher refractive index medium from the lower are never refracted since the optical surface is always chosen to have its center or radius coincident with the object or image being optically operated on by the lens. The system can be used to magnify the image of an object, the object being most any two-dimensional representation such as a negative or a positive print. The object might alternatively be a light source or an external object whose rays are imaged onto an embedded light sensor so that the functions of the source or sensor respectively can be enhanced by the optical system.

36 Claims, 10 Drawing Figures

OPTICAL AIR LENS SYSTEM

BACKGROUND OF THE INVENTION

This application is a continuation-in-part of application Ser. No. 427,257, filed Dec. 21, 1973 and now abandoned.

This invention relates to an optical system and more particularly to one using air lenses formed either as pockets in a solid monolithic optical medium or from thick or thin walled shells adapted to be immersed in a liquid optical medium.

The use of air lenses in submarine applications such as for swimmers or underwater photography has long been common to compensate for distortions introduced by the differences in refraction of light in water and air due to the difference in optical densities of the two mediums. The lenses of the human eye, being immersed in a watery solution which has an index of refraction quite similar to that of water, cannot focus light transmitted through a water medium, and undistorted vision is impossible without some optical correction. The use of air lenses formed from thin walled transparent material compensates for such distortion under water but has no substantial diffracting effect when used in air, thus permitting a swimmer to wear such lenses in and out of the water. In underwater photography air lenses have been interposed between the camera optics and the water medium to effect such corrections as are necessary for proper focus.

Because the refractive index of air is less than that of water, the refraction of a ray of light passing from water to air to water is exactly the opposite of the refraction of a water lens in air. A water or glass lens in air would have to be convex to focus the light at some certain point. But in water or in some other optical medium of high refractive index, an air lens would necessarily have to be concave to achieve the same result.

Optical systems of this type relate closely to immersion optics used in some high power microscopes. Such systems achieve nearly aberration-and distortion-free magnification based largely on the utilization of the aplanatic points of a system. The significance of an aplanatic point of a system is that a ray emanating from such a point within an optical medium having a refractive index higher than its surroundings appears to come exactly from another point (the aplanatic conjugate). The light rays are not in general collimated when they leave the high index medium but they have no spherical aberration. This is an important property of aplanatic points since spherical aberration is a common form of aberration which consequently is most important to correct. For on-axis imaging, it is indeed the only aberration. For near off-axis points, the sine condition is satisfied and coma is also eliminated.

A well-known aplanatic lens which will increase the convergence of a cone of rays without introducing spherical aberration must meet several general conditions. A first optical surface or "aplanatic surface" is arranged in relation to the object according to the following relationship:

$$l = r(n_2 + n_1)/n_2 \qquad (1)$$

where $l$ is the distance between the vertex of the surface and the object; $r$ is the radius of curvature of the surface; $n_1$ and $n_2$ are the refractive indices of the first and second optical mediums ($n_2 > n_1$). A second surface is made concentric with the image formed by the first surface. The rays are then not refracted by the second surface but are refracted by the first surface without introducing spherical aberration.

In the present invention an improved optical system is achieved utilizing air lenses in an optical medium of high refractive index by applying the aplanatic principle to the arrangement of lenses and object.

SUMMARY OF THE INVENTION

In accordance with the invention, an optical system is provided composed of a first optical medium of a relatively high refractive index having a plurality of pockets therein of an optical medium of a relatively low refractive index. An object either embedded within the first optical medium or directly contiguous to it is positioned at a fixed predetermined distance from the plurality of pockets, which for instance if filled with air would comprise air lenses. The plurality of pockets having properly configured interfaces with said first optical medium are so constructed to give substantially spherical aberration-and coma-free magnification of the object. Each pocket has at least two optical surfaces defined by the interfaces between optical mediums. A ray exiting a high refractive index medium is either refracted according to the aplanatic principle or passes through the optical surface unrefracted. But a ray exiting a low refractive index medium into a high refractive index medium is never refracted. The radii of curvature and the vertices for each of the surfaces are chosen to meet these conditions. When more than two optical mediums are used, the same principles are applied. In alternative arrangements the object can be a light source or a light sensor or other proper optical object, the optical system being so designed to improve the functional operation of either device.

DESCRIPTION OF THE PREFERRED EMBODIMENTS

As used in this specification it is to be understood that the terms light and optical broadly include and refer to electromagnetic radiation in the wavelength range including infrared, visible, and ultraviolet.

Figure 1:
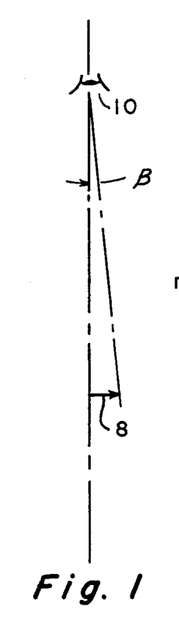
FIGS. 1, 2 and 3 respectively show schematically an eye viewing an object unaided by optics, aided by a normal condensing lens in air and aided by an air lens in a solid optical medium, the object being embedded in the solid.
Figure 2:
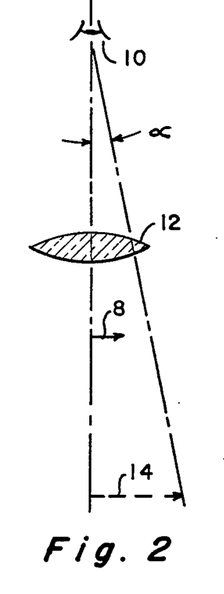
Figure 3:
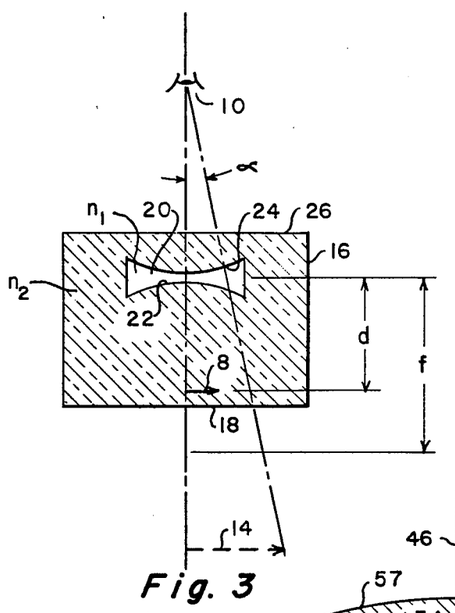

Referring now to FIGS. 1, 2 and 3 an object 8 is positioned in each Figure a specific distance from a viewer represented by eye 10. In FIG. 1 the unaided eye 10 views object 8 which subtends an angle $\beta$ at eye 10, encompassing the total length of object 8.

In FIG. 2 a simple positive lens 12 is interposed between eye 10 and object 8. By converging action of the lens 12 an image 14 of the object 8 is formed and magnified in a ratio proportional to $\alpha/\beta$ Magnification is determined by the linear size of the image 14 and its distance from eye 10.

In FIG. 3 a block 16 of a solid, homogeneous, isotropic optical medium, such as glass, plastic, etc., which is transmissive to light is shown in cross-section. The block 16 has a refractive index $n_2$. Embedded in block 16 is object 8. The block 16 is located such that object 8, for ease of comparison, is the same distance from eye 10 as in FIGS. 1 and 2. It is to be noted that essentially the same magnifying action will occur when object 8, which for instance could be a photographic print or a negative is contiguous to block 16, such as being affixed as a thin film flat against the bottom 18 of block 16.

A pocket 20 is formed in the block 16 during fabrication which contains air, a less dense optical medium, having a refractive index $n_1$. The refractive index of the block 16, $n_2$, is higher than $n_1$, thereby providing an optical system with just the reverse refractive characteristics from that shown in FIG. 2 where an optically dense lens 12 is immersed in air.

The pocket 20 acts as an air lens in the embodiment shown in FIG. 3 having concave optical surfaces 22 and 24. The object 8 is shown at a distance d from the optical mid-plane of air lens 20, the particular distance and curvature of surfaces 22 and 24 being determined by good design considerations to give an image with as little distortion as possible.

The magnified image 14 is formed as a result of light refraction at the interface between the top surface of block 16 and the air and also the refraction at the interfaces of the air lens 20 in the block 16. The magnified image 14 is subtended at eye 10 by the angle $\alpha$, and a measure of the magnification is the ratio of angles $\alpha/\beta$.

Figure 4A:
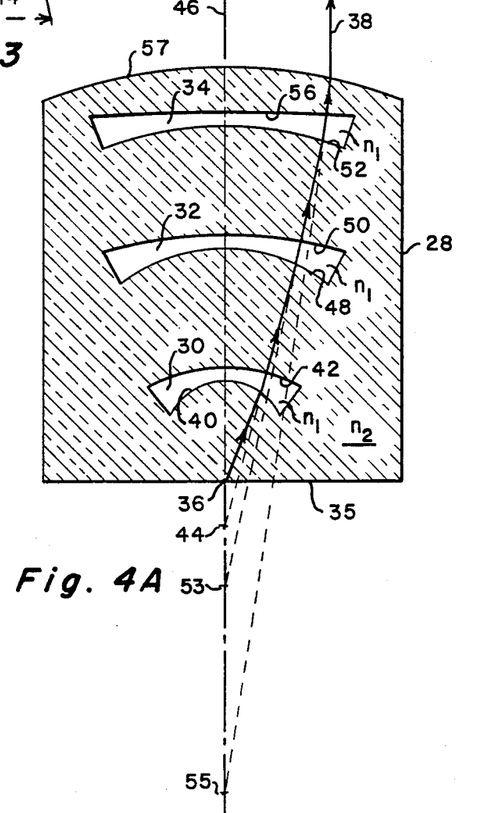
FIG. 4A shows a series of air lenses in a solid homogeneous optical medium utilizing the principles of the present invention.

In FIG. 4A a block 28 of a solid isotropic and homogeneous optical medium is shown in cross-section having a plurality of air pockets 30, 32 and 34, formed therein. The air pockets are essentially lens elements each having optical surfaces formed in a spherically concave shape with respect to the object 36. It will be appreciated that various combinations of concave and convex surfaces could be used which would be optically equivalent to the system shown.

In this optical system, the aplanatic principle is successively applied to each air lens 30, 32, and 34 by the proper choice of curvature for the air lens interfaces (optical surfaces) with the surfaces of the block 28. The sequentially alternate optical surfaces, going from high to low refractive index mediums in the direction of ray 38, refract the ray aplanatically. This is accomplished by designing the vertices of each such surface to be at an aplanatic point in accordance with equation (1). The other sequentially alternate optical surfaces, going from low to high refractive index mediums, do not refract ray 38 at all. This is accomplished by designing these surfaces to have centers of curvature coincident with the location of the images formed by the preceding surface. Spherical aberration and coma are thereby essentially eliminated. The refractive index for the optical medium comprising the block 28 is indicated by $n_2$, while the refractive index for the air contained in the air lenses is $n_1$, where $n_1 \approx 1.0$.

Assuming for purposes of explanation that object 36 is a light source, a typical light ray 38 from object 36 will be traced through the block 28 and air lenses 30, 32 and 34 until it emanates from the optical system. The object 36 is positioned at the aplanatic point nearest the vertex of surface 40 whose curvature is defined by a radius $R_1$. Because the object is at an aplanatic point refraction is free from spherical aberration and coma.

Ray 38 proceeds through the air lens 30 as though it emanated from the aplanatic point 44 farthest from the vertex of surface 40. The second surface 42 of the air lens 30 having a radius of curvature $R_2$ is designed such that the light source appears to be at its center of curvature 44; therefore no refraction occurs and the ray proceeds undeviated.

The first surface 48 of the air lens 32 is designed so that the image of the object 36 located at point 44, which is at the center of curvature of surface 42, lies at the aplanatic point nearest the vertex of the surface 48. The radius of curvature for surface 48 is $R_3$. Again, because of aplanatic refraction the ray appears to come from the aplanatic point farthest from the vertex of surface 48. Surface 50 having radius $R_4$ is designed so that rays appear to come from point 56, the center of curvature of surface 50. Therefore the path of ray 38 is undeviated upon leaving this surface.

The first surface 52 of air lens 34 is designed so that the apparent source of ray 38 lies at point 55 on the optical axis 46, the center of curvature of surface 50 and at the aplanatic point nearest the vertex of surface 52. The radius of curvature for surface 52 is $R_5$. Aplanatic refraction of ray 38 occurs at surface 52 causing the ray 38 to appear to come from the aplanatic point 55 farthest from the vertex of surface 52.

At surface 56 of air lens 34, having a radius $R_6$, the ray 38 is slightly but not aplanatically refracted to assist in collimating it with respect to axis 46. The top surface 57 with a radius $R_7$ acts to complete the collimation of the ray 38. Thus these last two surfaces cause only slight refraction of the ray and therefore complete final collimation with negligible introduction of aberration.

More than the three air lenses shown could be used in alternate configuration so that the light emanating from block 28 is so nearly collimated that optical surfaces such as surfaces 56 and 57 need have very weak power. Thus although not aplanatic, they could complete the collimation while introducing almost completely negligible spherical aberration and coma. It is to be noted that the rays from the object point must originate or appear to originate inside the optical medium of high refractive index $n_2$. In the optical system of FIG. 4A this condition for aplanacity was satisfied by choosing a curvature of surface 40 so that aplanatic refraction occurred there.

Where object 36 is a light source embedded in the high refractive index medium, block 28, the rays emanating therefrom, start from the high refractive index medium, thereby satisfying the condition for immersion optics as discussed above. Of course, conversely, rays arriving in the high refractive index medium can be brought to a focus at object 36, which can alternatively be a light detector. In the case where object 36 is a detector, the gain in brightness over a system, whose image surface is in air, varies as the square of the refractive index of the medium. Therefore, the light gain of the optical system of FIG. 4A is greatly enhanced because of the high optical density of the medium and because of freedom from spherical aberration. The configuration of FIG. 4A can collect and gather light effectively at a detector, or conversely collimate efficiently the light from a radiant source such as a light-emitting diode into a beam of constant cross-section.

The block 28 also lends itself to a structure of overall stability, for once properly aligned, each optical surface and the light source, detector or object to be magnified, being embedded in block 28, would be rigidly held in proper inter-relationship. The block 28, indeed, may be a monolithic structure of a material such as an acrylic, polyester, polycarbonate, glass, or other similar type optical material.

The optical air lens system described herein utilizes only a single optical material in addition to air. This introduces chromatic aberration when using white light and thus necessitates special design considerations. Chromatic aberration in conventional systems is generally reduced or eliminated by using optical materials having different dispersion (the variation of refractive index with wavelength) characteristics. The use of this technique is obviously not possible in the design of an optical system which utilizes a single optical material.

In order to realize an achromatic condition in such a system, the design approach here is to arrange the powers and spacings so that, in addition to correction of other aberrations, the total power variation relative to a refractive index change is small or zero. Thus, denoting the total optical power by $\Phi$, $$\frac{d\Phi}{d n} \simeq 0. \qquad (2)$$

The principle is illustrated in a well-known doublet eyepiece as follows. The total power is:

$$\Phi = (n-1) K_1 + (n-1) K_2 - (n-1)^2 K_1 K_2 s \qquad (3)$$

where $n$ is the refractive index, which is identical for both doublet components, $K_1$ and $K_2$ are geometrical constants, and $s$ is the doublet separation. The derivative of $\Phi$ is:

$$\frac{d\Phi}{dn} = K_1 + K_2 - 2(n-1) K_1 K_2 s \qquad (4)$$

and this must equal zero. Multiplying the derivative through by $n-1$ produces:

$$(n-1) K_1 + (n-1) K_2 - 2(n-1)^2 K_1 K_2 s = 0. \qquad (5)$$

Since $(n-1) K_1$ and $(n-1) K_2$ are powers, respectively, of the two components, $\Phi_1$ and $\Phi_2$, $$s = \frac{1}{2}\left[\frac{1}{\Phi_1} + \frac{1}{\Phi_2}\right] = \frac{1}{2}[f_1 + f_2] \qquad (6)$$

where $f_1$ and $f_2$ are the focal lengths of components 1 and 2. Therefore the doublet shows no variation with wavelength and is achromatic when the doublet separation equals the mean of the focal lengths.

The optical air lens system of a single optical material is not so simple, especially as the object rays originate in the high index medium. However, the principle is the same and will produce achromaticity if in the design of the air lens system the same general considerations are taken.

The values for the optical parameters of an exemplary design for the embodiment of FIG. 4A wherein the first optical medium 28 is a solid, acrylic plastic and the second optical medium in pockets 30, 32 and 34 is a gas such as air are given in the table below. An aplanatic air lens system employing the principles described in the instant case including object image relationships stated in equation 1 is exemplified in the following design.

The monolithic material which is acrylic plastic has a refractive index $n_2 = 1.491$, and an Abbe constant $V = 61.6$. The refractive index $n_1$ of the air in pockets 30, 32 and 34 is unity. The object is at location 36 of FIG. 4A. The vertex of the first spherical surface, 40 is 0.417673 units above object 36, all vertices lying on the optical axis, 46. The radius of curvature $R_1$ of surface 40 is $-0.25$ units (concave toward the object 36); therefore, according to equation 1, the object is at an aplanatic point of refracting surface 40. Upon refraction, it will appear to come from a point 0.62275 units below surface 40, the magnification being 1.491. The vertex of surface 42 is 0.06 units above that of surface 40. The radius of surface 42 is 0.68275 units; therefore the image formed by surface 40 is at the center of curvature of surface 42 and no refraction occurs as the rays re-enter the high refractive index medium.

The rays proceed to surface 48 of air lens 38 where they are aplanatically refracted upon leaving the high refractive index medium, the radius of curvature of surface 48 is $-0.707941$ units (concave toward the object 36). The vertex of surface 48 lies on optical axis 46, 0.5 units above the vertex of surface 42.

Surface 50 has its center of curvature at the image formed by surface 48 and no refraction occurs upon re-entering the high refractive index medium. The first surface 52 of air lens 34 produces the final aplanatic refraction in the same fashion as before described for surfaces 40 and 48.

The final surfaces, namely the second surface, 56 of cavity 34, and the top surface 57 of the block 28 do not refract ray 38 aplanatically according to equation 1, but ray 38 is so nearly parallel to optical axis 46 that these surfaces need exert only weak refractive power to render ray 38 parallel. The required dioptics are so few, in fact, that a configuration wherein the top surface of block 28 is plano would produce high optical quality. Allowing the top surface 57 of block 28 to have a non-zero curvature as shown in FIG. 4A permits a design providing near perfect optical quality.

The following table summarizes the optical parameters for the above design. All negative radii indicate concave downward curvature and all centers and vertices are on the optical axis 46. The curvatures and spacings are referenced starting from the bottom of block 28. Dimensions are in arbitrary units. The refractive index and Abbe constant of the first optical material are $n_1 = 1.491$ and $V = 61.6$ and since the second optical medium is air, $n_2 = 1.0$.

| Surface | Radius (R) | Separation from Previous Vertex (d) |
|---|---|---|
|  |  | .417673 (Separation from object 36) |
| 40 | −.25 (R1) |  |
| 42 | −.682750 (R2) | .06 |
| 48 | −.707941 (R3) | .5 |
| 50 | −1.823480 (R4) | .06 |
| 52 | −1.390682 (R5) | .5 |
| 56 | 10.990797 (R6) | .06 |
| 57 | −2.094874 (R7) | .125 |

The following table confirms the near perfect optical performance of the design. The table shows the longitudinal spherical aberration of parallel rays incident at the top of block 28, parallel to axis 46, and brought to a point focus at the location of object 36 on optical axis 46. This reverse ray trace is, of course, a classical optical test of image quality. Unaberrated rays will come to a focus 0.417673 units below the vertex of surface 40 as stated in the table below.

The column denoted L.S.A. (longitudinal spherical aberration) indicates the height above the ideal point at which rays intersect the optical axis 46. The first column indicates the distance from optical axis 46 at which parallel rays, parallel to axis 46 enter block 28. The optician designates this quantity the ray height.

| Ray Height | L.S.A. | Tangential Coma |
|---|---|---|
| .1 | .00020 |  |
| .2 | .00075 |  |
| .3 | .00165 |  |
| .4 | .00287 |  |
| .5 | .00439 | .003 (Maximum) |

The significance of the table is emphasized by the air lens system speed of approximately $f/1$. This illustrates its efficient light-gathering power, or again its unusual ability to collimate a small light source.

One should be aware that the object's position can be adjusted within limits. The object 36 is shown in FIG. 4A located at the bottom of block 28, either within the block 28 itself or contiguous to the bottom surface 35. Object 36 should be substantially located at the nearest aplanatic point to the surface 40, but indeed small changes in the location of the object 36 may introduce only slight aberration. For instance placing the object in a depression in the bottom surface or even next adjacent the block 28 but still approximately at the aplanatic point may not introduce significant aberration for a given application. Also the object 36 can be placed in a spherical air cavity in the bottom surface 35 centered on optical axis 46 without introducing any additional aberration, provided the object is still substantially at the aplanatic point of surface 40 and at the center of curvature of the cavity.

Figure 4B:
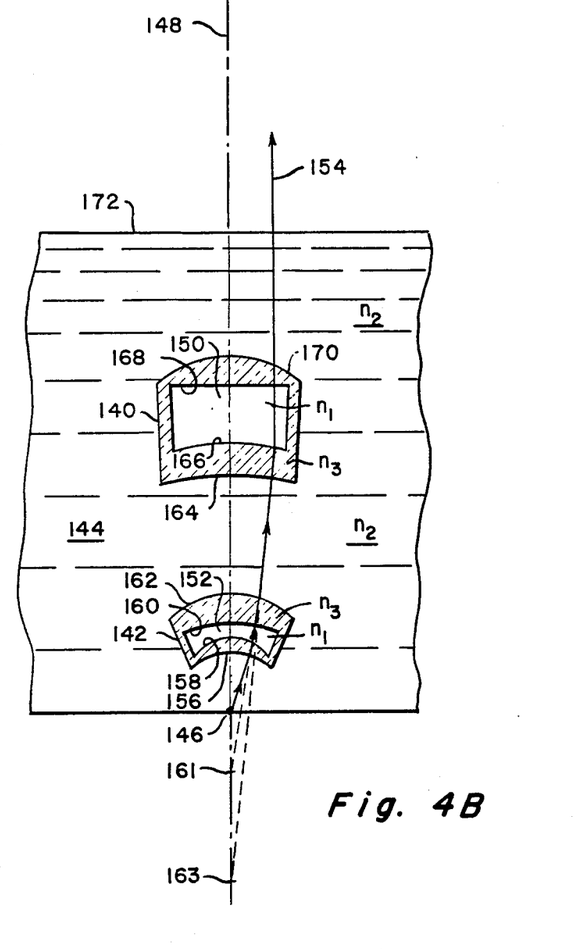
FIG. 4B shows a system of air lenses made from variable thickness, light-transmissive material immersable in a liquid and utilizing the principles of the present invention.

Now referring to FIG. 4B, a further embodiment of the present invention is shown which utilizes three optical mediums and in which air lenses 140 and 142 are constructed of variable wall thickness shells made of a translucent optical material such as plastic or glass and immersed in a liquid 144 such as water. An object 146 is shown on the optical axis 148 of the optical air lens system.

Figure 5:
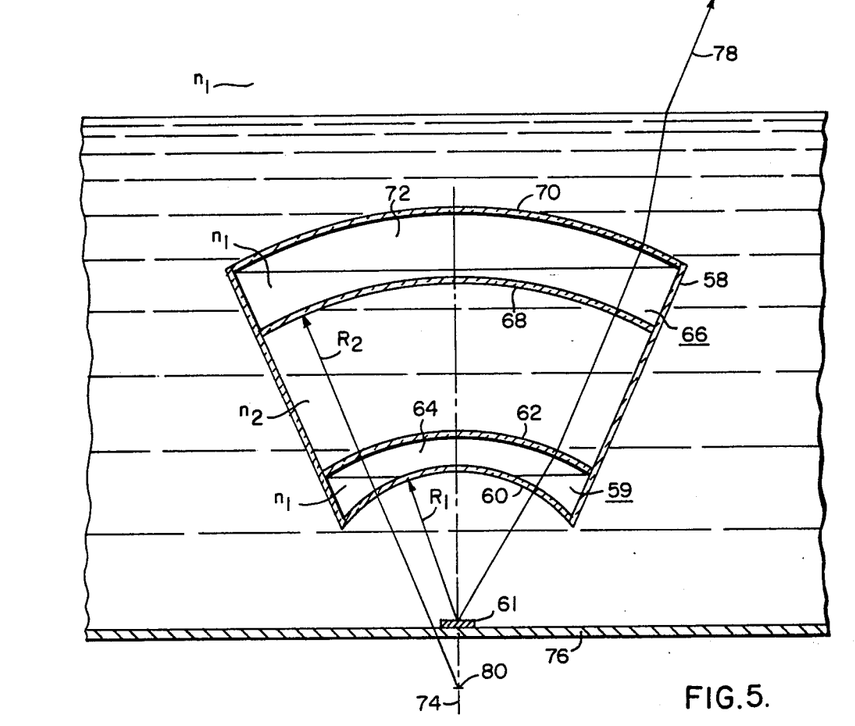
FIG. 5 shows a modified embodiment of a series of air lenses made from thin-wall, light transmissive material immersible in a liquid and utilizing the principles of the present invention.

The optical system including lenses 140 and 142 and object 146 are held in relative position one to the other by structure not shown here such as that disclosed with the embodiment shown in FIG. 5. This particular embodiment refracts light according to the aplanatic principle at alternate surfaces as the light passes from a high to a low refractive index medium. Alternate optical surfaces, as the light goes from low to high refractive index medium, however, are so constructed to have their center of curvature coincident with the image or object therefore causing no refraction of light. It will be recognized that this embodiment consequently does not require the assumption of negligible refraction at certain surfaces as is required by the embodiment of FIG. 5.

Typically the pockets 150 and 152 of air lenses 140 and 142 respectively, contain air having a refractive index $n_1$. The walls of lenses 140 and 142 can be constructed of an optical material such as glass or plastic having a refractive index $n_3$. The liquid 144 is typically water having a refractive index $n_2$. In such a configuration, the refractive indices of the various materials are related as follows: $n_1 < n_2 < n_3$.

Assuming object 146 to be a light source, a ray 154 can be traced through the system of FIG. 4B. Ray 154 emanates from object 146 which is coincident with the center of curvature of the first optical surface 156 which has a radius $R_1$. No refraction therefore occurs at surface 156.

The second optical surface 158 having a radius of curvature $R_2$ is so constructed to cause the object point 146 to be an aplanatic point according to equation 1. The liquid in the system does not alter the aplanatic refraction process since only air and the solid shell material of lens 142 define the interface and affect the direction of ray 154. At the surface 158, ray 154 passes from a high to a low refractive index medium.

Ray 154 proceeds undeviated through the next or third optical surface 160 which has a radius of curvature $R_3$. There is no refraction at the third surface 160 since the center of curvature coincides with the point 161 located on optical axis 148. The image point 161 is the point from which ray 154 appears to come after refraction at the second optical surface 158. The upper surface of lens 142, i.e. the fourth optical surface 162 which has a radius of curvature $R_4$ does refract the ray 154 aplanatically. Here the interfacing optical media producing aplanatic refraction are the liquid having a refractive index $n_2$ and the solid shell material of lens 142 having refractive index of $n_3$. The ray 154 now twice aplanatically refracted proceeds through the liquid medium 144 as though it were emanating from image point 163 on optical axis 148.

The ray 154 proceeds unrefracted through the fifth optical surface 164 which has a radius of curvature $R_5$ since the center of curvature of this surface coincides with the image point 163. But the ray 154 is again aplanatically refracted at the sixth optical surface 166 which has a radius of curvature $R_6$. This refraction occurs because the image point 163 is at an aplanatic point with reference to surface 166 as required by equation 1.

The ray 154 now proceeds through the air pocket 150 being nearly parallel with the optical axis 148 of the system. Therefore a non-aplanatic refraction at surface 168 which has a radius or curvature $R_7$ tends to complete the collimation of the ray without introducing significant image degradation. The final optical surface 170 with a radius of curvature $R_8$ further completes the collimation process. The last two optical surfaces are curved to minimize the residual aberrations introduced at this refraction. Of course, the final interface is that of the liquid air boundary 172 where ray 154 emerges from the system. This boundary is necessarily optically flat, having no effect on ray 154 assuming the system has successfully collimated the ray and it exits normal to surface 172.

The values for the optical parameters of an exemplary design for the embodiment of FIG. 9, are given in the table below. It is assumed that the liquid medium is water, the optical shell material is BK-7 optical glass and the pockets 150 and 152 are air pockets. The respective refractive indices are: water — 1.330; BSC-2 (BK-7) — 1.51700 and air — 1.0. All measurements are made on optical axis 148 where all centers of curvature lie. The first spacing $d$ is the distance from the object point 146 to the vertex of the first surface 156 and the subsequent spacings indicate the distances between the respective vertices of the optical surfaces. The final spacing is the distance from the optical surface 170 to the surface 172. The radii are numbered starting from the first surface 156 and the dimensions are in arbitrary units.

| Surface | Radius (R) | Separation from Previous Vertex (d) |
|---|---|---|
| 1 (156) | −.25 ($R_1$) | .25 |
| 2 (158) | −.18684 ($R_2$) | .06 |
| 3 (160) | −.53027 ($R_3$) | .06 |
| 4 (162) | −.34916 ($R_4$) | .125 |
| 5 (164) | −1.24404 ($R_5$) | .49663 |
| 6 (166) | −.82513 ($R_6$) | .125 |
| 7 (168) | +100 ($R_7$) | .25 |
| 8 (170) | −.45583 ($R_8$) | .125 |
| 9 (172) | ∞ | .5 |

As can be seen from the above design parameters, all optical refracting interfaces, except those final low powered surfaces for collimation and the top surface of the system, are designed to either aplanatically refract ray 154 or not to refract it at all. For those surfaces which aplanatically refract, namely optical surfaces 158, 162 and 166, the relationship between object or image and surface curvature are determined by equation 1.

A special modification of this optical lens system having a thin-walled shell structure is shown in FIG. 5. This system can be considered to be comprised of only two optical materials (gas and liquid) thereby assuming the shell structure itself to have negligible optical effect. Or it can be considered to be a system including three optical materials (gas, liquid and solid), but with the optical surfaces of the shell being shaped and configured to minimize its effect on the optical characteristics of the system. When characterized as a system comprised of three optical materials, it will be recognized to be a modification of the embodiment of FIG. 4B, discussed above.

In FIG. 5 a thin-walled structure 58 of a light-transmitting material is shown immersed in a liquid having a refractive index $n_2$. The walls of structure 58 have a constant thickness and for purposes of this analysis will be assumed to be made of an optical material having a refractive index $n_3 > n_2$. For instance the walls could be of an optical glass with $n_3 \approx 1.5$ and the liquid could be water with $n_2 \approx 1.33$.

A first air lens 59 is shown defined by curved, light-transmissive walls 60 and 62 which form, relative to object 61, first and second refraction interfaces, respectively, between the liquid medium and the air within the cavity 64 of the air lens 59. Since air has a refractive index of unity, $n_1 < n_2 < n_3$.

A second air lens 66 is defined by curved, light-transmissive walls 68 and 70 which form, relative to object 61, first and second refraction interfaces, respectively, between the liquid medium and the air within cavity 72 of air lens 66. The first and second air lens 59 and 66 are held rigidly relative one to the other by structure 58 so that the optical axis 74 of the system is also the axis of symmetry of the lens system.

For magnification of object 61 the structure 58 is positioned so that object 61 coincides with the center of curvature of the curved wall 60 as determined by radius $R_1$. Structure 58 can be positioned manually, or it can be so fabricated that its buoyancy causes it to stabilize at some given depth in a liquid medium. Alternatively, the structure 58 could include a stand, not shown in FIG. 5, which would position the air lens system the proper distance above object 61 by finding support on the floor 76 of the liquid container.

Light ray 78 is representative of the path of light through the air lens system of FIG. 5. As is readily apparent, the principle of aplanacity can be used in this structure to effectively eliminate or limit spherical aberration and coma. Tracing ray 78 through the first wall 60 there is no refraction. Each side of the wall 60 offers an optical surface between mediums of different refractive indices. But the object 61 is located at the center of curvature for each surface and so no refraction of ray 78 occurs at either.

The ray 78 passes from a lower refractive index medium ($n_1$) to a higher refractive index medium ($n_3$) as it enters the wall 62. Consequently there should be no refraction to be consistent with the aplanatic principles previously discussed. Rather than no refraction, a small refraction occurs at the first surface of wall 62. However, ray 78 is aplanatically refracted at the upper surface of wall 62 as the ray exits the higher refractive index medium ($n_3$) and enters the lower refractive index medium, ($n_2$). To accomplish a slight refraction at the bottom surface of wall 62 and an aplanatic refraction at the top surface of wall 62 may require the two surfaces to have somewhat different radii. The ray 78 then proceeding through the liquid medium appears to come from a point 80 on the optical axis 74.

The wall 68 is designed to have a center of curvature at point 80 and a radius of curvature $R_2$. Consequently, the ray 78 passes through wall 68 with no refraction into the cavity 72 of lens 66. The ray 78 when it emerges from the second surface of wall 70 of air lens 66 is refracted as before discussed in reference to wall 62.

The optical system of FIG. 5 operates on light in a manner analogous to that of the system in FIG. 4B. Three optical mediums with indices $n_1$, $n_2$, and $n_3$ are integrated into the system, but the principle of refracting only when the object or image is at an aplanatic point relative to the optical surface is substantially followed in the system of FIG. 5. Refraction also occurs only from high to low refractive index mediums, except for negligible refraction at the air to wall interface within each lens 59 and 66.

Figure 6A:
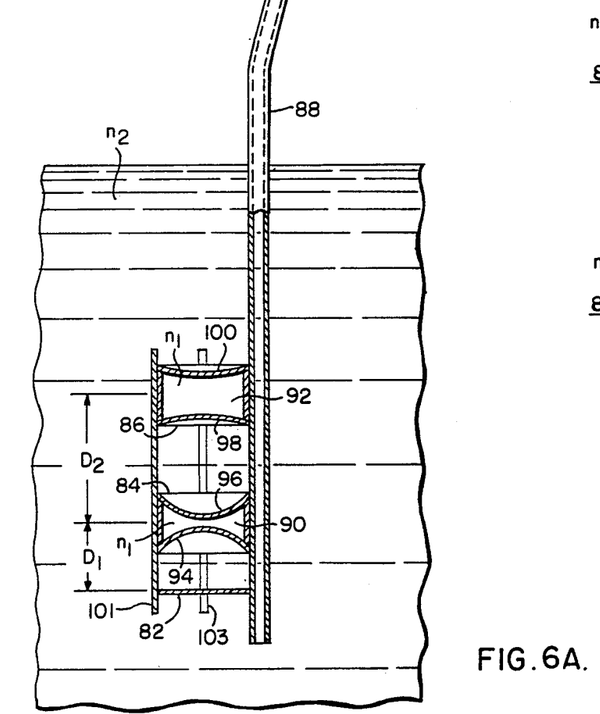
FIG. 6A shows an embodiment of the present invention in partial cross-section.

In FIG. 6A a particular application for the air lens systems of either FIGS. 4B or 5, incorporated in a drinking straw, is shown in cross-section wherein additionally the object structure 82 is fixedly positioned a given distance $D_1$ and $D_1 + D_2$ relative to the lens system comprised of air lenses 84 and 86 respectively. In the embodiment of FIG. 6A the air lens system has been permanently attached to a drinking staw 88 (representative of one application to novelty-type devices) which can be submerged in a liquid having a refractive index $n_2$.

The air lenses 84 and 86 have air cavities 90 and 92, respectively, having a refractive index $n_1$ where $n_1 < n_2$. Each is confined by curved, light-transmissive walls with an index $n_3$ higher than $n_1$ and $n_2$ which also establish the optical surfaces of the air lenses 84 and 86. Lens 84 can be made having a smaller radius than that of lens 86, as for instance was done in FIG. 5, thereby maximizing magnification of system. The lens 84 includes curved walls 94 and 96, and lens 86 includes curved walls 98 and 100.

Figure 6B:
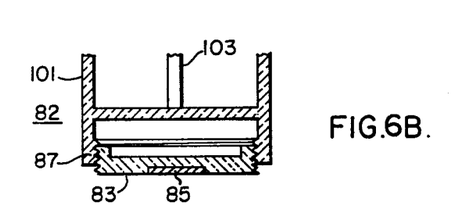
FIG. 6B shows a detail cross-section of the object structure of the embodiment of FIG. 6A.

The structure is given stability by struts 101 and 103 and by straw 88, which can all be of plastic for instance. The object structure 82 can also be made removable or replaceable as shown in FIG. 6B, for example, wherein element 83 containing the object 85 is threadably attached to the bottom 87 of the straw assembly.

Figure 7:
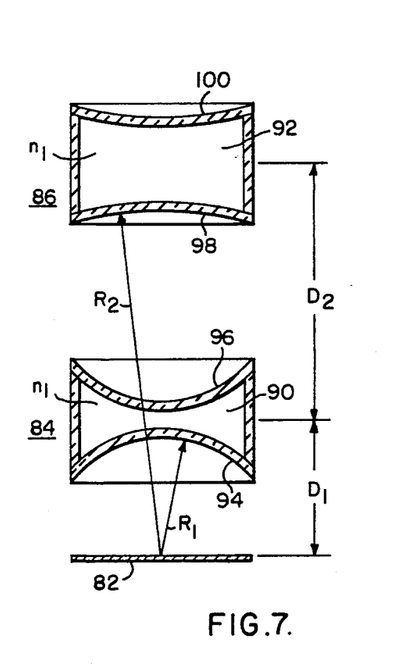
FIG. 7 shows the detailed relationship of the elements of FIG. 6A in cross-section.

The optical principles previously described can be applied likewise to the device of FIG. 6A. This is shown in detail in FIG. 7. Generally, it will be readily seen that by proper optical design, the aplanatic principle can be repeatedly applied to any number of air lenses such as 84 and 86 to obtain magnification with little or no spherical aberration. Of course the optical system having variable wall thickness of FIG. 4B could also be used in the structure of FIG. 7.

Figure 8:
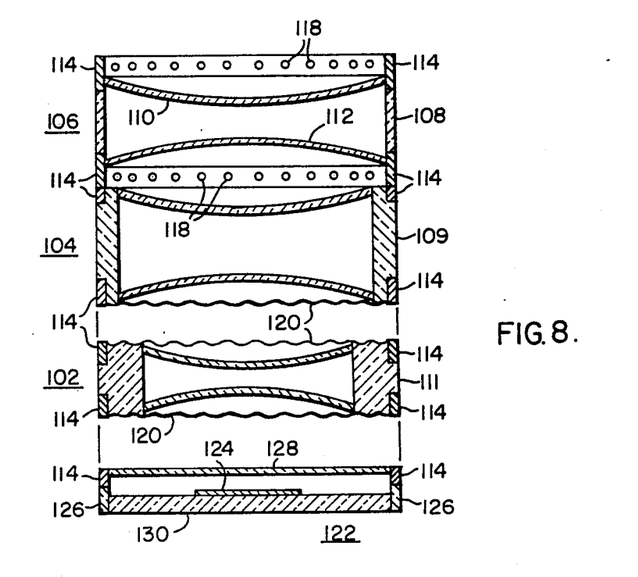
FIG. 8 shows another embodiment of the present invention in which individual lens elements are detachable.

In FIG. 8 another variation using a plurality of air lenses 102, 104 and 106, which can be removably attached one to another, is shown. This embodiment can use the basic concepts of either FIGS. 4B or 5, each lens is self-contained and fabricated of a thin walled, light-transmissive material having curved wall portions enclosing an air cavity. Air lens 106, for example, has side wall segments 108 forming a cylinder spanned by curved wall portions 110 and 112 which provide the optical surfaces for the lens. Such a lens could be immersed in a liquid medium individually or attached in combination with other air lenses.

Small magnetic segments 114 of a suitable magnetic material are affixed to the outer perimeter of the cylindrical wall portions 108, 109 and 111 of the lenses 106, 104 and 102 respectively. The segments 114 can be spaced equally around the circumference of each lens in a manner such that corresponding segments of different lens elements can easily be aligned. Sufficient segments 114 are used to hold the lenses in a detachable alignment one with another, and in the limiting case the segments 114 can form a continuous magnetic ring around the entire circumferance of the wall portions. It is to be understood that other methods of attaching the lenses in a stacked relationship can be used, such as with bolts or pins inserted through appropriate brackets or alternate interior and exterior threaded portions on the wall segments.

Each lens element 102, 104 and 106 is additionally designed with holes 118 in the wall portions 111, 109 and 108 respectively, or with fluted edges 120 to allow passage of fluid into the spaces between the attached lenses.

An object disc 122 containing some object 124, such as a photographic print, is shown having side wall segments 126 which form a cylinder spanned by light-transmissive top wall 128 and bottom wall 130. The object disc 122 is scaled to the size of the individual lens elements 102, 104 and 106 and also has magnetic segments 114 mounted in sidewall segments 126 so that the disc can be attached to one or more of the air lens elements. Thus a total optical air lens system comprised of an object disc 122 and a plurality of lenses such as 102, 104 and 106 can be put together into a rigid structure which also can be easily disassembled by applying sufficient force to overcome the magnetic holding force.

It should be clear that the plurality of air lens elements and the object disc 122 of FIG. 8 can be designed with proper curvature of optical surfaces and adjustment of distances between elements by using various surfaced optical elements, including prisms, magnifying and demagnifying lenses, such that the optical principles describes above can be applied to this embodiment.

What is claimed is:
1. An optical lens system operative on a light ray comprising:
   a first optical medium having a first refractive index,
   a second optical medium having a second refractive index of a higher value than said first refractive index,
   a plurality of pockets formed in said second optical medium containing said first optical medium, said plurality of pockets having a single coincident optical axis and each defining first and second optical surfaces at the interfaces between said first and second optical mediums,
   an object located substantially at an aplanatic point of at least one of said optical surfaces within or contiguous to said second opical medium,
   selected surfaces from among said first and second optical surfaces through which said light ray when emanating in a direction from said object toward said plurality of pockets is refracted when passing from high to low refractive index mediums being so constructed and arranged relative to said object to refract said ray aplanatically thereby substantially eliminating spherical aberration and coma, and
   all said optical surfaces other than said selected surfaces are so constructed and arranged to pass said light ray substantially without refraction.
2. The optical lens system of claim 1 wherein said selected optical surfaces are the first optical surfaces of each of said plurality of pockets.
3. The optical lens system of claim 1 wherein all of said first and second optical surfaces are concave with respect to said object.
4. The optical lens system of claim 1, further including at least one final optical surface of low powder for causing final collimation of said light ray relative to the longitudinal axis of said optical lens system.
5. The optical lens system of claim 1, wherein all said optical surfaces other than said selected optical surfaces are so constructed and arranged to have their respective centers of curvature substantially coincident with the image formed by the next preceding optical surface.
6. The optical lens system of claim 1 wherein said second optical medium is a light-transmissive, isotropic, monolithic solid, said object being embedded in or contiguous to said second optical medium and all said optical surfaces of said plurality of pockets being so constructed and arranged to form a magnified image of said object while reducing optical aberrations.

7. The optical lens system of claim 6 wherein said first optical medium is a gas.

8. The optical lens system of claim 1, wherein said object is an optical sensor and wherein said optical surfaces defined by said plurality of pockets are so arranged and constructed to optimize light gathering at said optical sensor.

9. The optical lens system of claim 1 wherein said second optical medium is a light transmissive, isotropic solid, said object is a light emitting source and said optical surfaces defined by said plurality of pockets are so arranged to collimate said light ray emanating from said optical system relative to the optical axis of said optical system.

10. An optical lens system operative on a light ray comprising:
  a first optical medium having a first refractive index,
  a second optical medium having a second refractive index,
  a plurality of pockets which contain said first optical medium,
  a third optical medium having a third refractive index configured to define said pockets and being contiguous to said first and second optical mediums,
  said third refractive index being higher in valve than said second refractive index and said second refractive index being higher in value than said first refractive index,
  a plurality of optical surfaces having coincident optical axes and being defined by the interface between said first and third optical mediums and said second and third optical mediums,
  an object located substantially at an aplanatic point of at least one surface within or contiguous to said first optical medium,
  selected optical surfaces from among said plurality of optical surfaces through which said light ray emanating in a direction from said object toward said plurality of pockets is refracted when passing from high to low refractive index mediums being so arranged and constructed relative to said object to refract said ray aplanatically thereby substantially eliminating aberration and coma, and
  all said optical surfaces other than said selected optical surfaces are so constructed and arranged to pass said light ray substantially without refraction.

11. The optical lens system of claim 10 wherein all said optical surfaces other than said selected optical surfaces are so constructed and arranged that their respective centers of curvature are located coincident with the image formed by the next preceding optical surface.

12. The optical lens system of claim 10 wherein said selected optical surfaces are sequentially alternate optical surfaces from among said plurality of optical surfaces.

13. The optical air lens system of claim 10 wherein said fist optical medium is a gas, said second optical medium is a liquid and said third optical medium is a solid.

14. The optical air lens system of claim 13 further including structural support means for holding and positioning in fixed relationship said plurality of pockets relative to said object.

15. The optical air lens system of claim 14 wherein said object is removably positioned by said structural means for easy interchangeability of objects.

16. The optical air lens system of claim 14 further including a drinking straw rigidly attached to said structural support means.

17. The optical lens system of claim 10 wherein said plurality of pockets are individually detachably held by said structural wall means so that said pockets are interchangeable.

18. The optical lens system of claim 10 wherein said object is an optical sensor and said plurality of optical surfaces are so arranged and constructed to optimize light gathering at said optical sensor.

19. The optical lens system of claim 10 wherein said object is a light emitting source and said plurality of optical surfaces are so arranged and configured to collimate a uniform output beam of light rays emanating from said light emitting source relative to the optical axis of said optical lens system.

20. An optical lens system operative on a light ray for viewing an object within or contiguous to a liquid medium from a medium of lower refractive index such as air, comprising:
  a plurality of light transmissive air lenses formed from a thin walled optical material,
  structural wall support means for holding and positioning in fixed relationship said plurality of air lenses so that the optical axes of all of said air lenses are parallel and coincident,
  each said air lens having a first and second optical surface defined by the interface between said air and said liquid formed by said thin walled optical material,
  said thin walled optical material having walls of a thickness to have negligible refracting effect on the ray,
  an object positioned in an object plane relative to said plurality of air lenses such that the center of curvature of one surface of at least one of said air lenses lies in said object plane,
  selected optical surfaces from among said first and second optical surfaces through which said light ray emanating in a direction from said object toward said plurality of air lenses is refracted when passing from high to low refractive index medium being so constructed and arranged relative to said object to refract said ray aplanatically thereby substantially eliminating spherical aberrations and coma, and
  all said optical surfaces other than said selected surfaces are so constructed and arranged to pass said light ray substantially without refraction.

21. The optical lens system of claim 20 wherein all said optical surfaces of said air lenses other than said selected optical surfaces are constructed and arranged such that the center of curvature of each is substantially coincident with the image formed by the next preceding optical surface whereby said light ray passes without refraction.

22. The optical lens system of claim 20 wherein said object lies at the bottom of said liquid medium and the buoyancy of said structural wall support means is such that in a given depth of said liquid medium, said structural support means will stabilize at a predetermined distance above said object.

23. The optical lens system of claim 20 wherein said structural wall support means further supports said object at a predetermined distance from said plurality of air lenses.

24. The optical lens system of claim 23 wherein said object is removably positioned in said object plane for easy interchangeability of objects.

25. The optical lens system of claim 23 further including a drinking straw rigidly attached to said structural support means.

26. The optical lens system of claim 20 wherein said plurality of air lenses are individually detachably held by said structural wall means so that said lenses are interchangeable.

27. The optical lens system of claim 20 wherein said object is an optical sensor and said plurality of said air lenses are so arranged and constructed to optimize light gathering at said optical sensor.

28. The optical lens system of claim 20 wherein said object is a light emitting source and said plurality of air lenses are so arranged and configured to collimate a uniform output beam of light rays emanating from said light emitting source relative to the optical axis of said optical lens system.

29. An optical lens system operative on a light ray comprising:
a first optical medium having a first refractive index,
a second optical medium having a second refractive index of a higher value than said first refractive index,
a single pocket formed in said second optical medium containing said first optical medium, said pocket having first and second optical surfaces at the interfaces between said first and second optical mediums,
an object located substantially at an aplanatic point of at least one of said optical surfaces within or contiguous to said second optical medium,
a surface selected from said first and second optical surfaces through which said light ray when emanating in a direction from said object toward said at least one pocket is refracted when passing from high to low refractive index mediums so constructed and arranged relative to said object to refract said ray aplanatically thereby substantially eliminating spherical aberration and coma, and
said optical surface other than said selected surface is so constructed and arranged to pass said light ray substantially without refraction.

30. The optical lens system of claim 29 wherein said first and second surfaces are concave with respect to said object.

31. The optical lens system of claim 29, further including at least one final optical surface of low power for final collimation of said light ray relative to the longitudinal axis of said optical lens system.

32. The optical lens system of claim 29, wherein said surface other than said selected surface is so constructed and arranged to have its center of curvature substantially coincident with the image formed by the selected optical surface.

33. The optical lens system of claim 29 wherein said second optical medium is a light-transmissive, isotropic, monolithic solid, said object being embedded in or contiguous to said second optical medium.

34. The optical lens system of claim 29 wherein said first optical medium is a gas.

35. The optical lens system of claim 29, wherein said object is an optical sensor and wherein said optical surfaces defined by said pocket are so arranged and constructed to optimize light gathering at said optical sensor.

36. The optical lens system of claim 29, wherein said second optical medium is a light transmissive, isotropic solid, said object is a light emitting source and said optical surfaces defined by said pocket are so arranged to collimate said light ray emanating from said optical system relative to the optical axis of said optical system.

* * * * *